US010458497B2

(12) United States Patent
Poisson

(10) Patent No.: US 10,458,497 B2
(45) Date of Patent: Oct. 29, 2019

(54) HYBRID ELECTRIC AND HYDRAULIC BRAKE SYSTEM

(71) Applicant: GOODRICH CORPORATION, Charlotte, NC (US)

(72) Inventor: Richard A. Poisson, Avon, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 10 days.

(21) Appl. No.: 14/753,878

(22) Filed: Jun. 29, 2015

(65) Prior Publication Data

US 2016/0377134 A1 Dec. 29, 2016

(51) Int. Cl.
| | |
|---|---|
| *F16D 65/14* | (2006.01) |
| *B60T 13/58* | (2006.01) |
| *B60T 13/74* | (2006.01) |
| *B64C 25/44* | (2006.01) |
| *F16D 121/04* | (2012.01) |
| *F16D 121/18* | (2012.01) |

(52) U.S. Cl.
CPC ............ *F16D 65/14* (2013.01); *B60T 13/588* (2013.01); *B60T 13/741* (2013.01); *B64C 25/44* (2013.01); *F16D 2121/04* (2013.01); *F16D 2121/18* (2013.01)

(58) Field of Classification Search
CPC .. F16D 65/14; F16D 2121/04; F16D 2121/18; B64C 25/44; B60T 13/741; B60T 13/588
See application file for complete search history.

(56) References Cited

U.S. PATENT DOCUMENTS

| | | | | |
|---|---|---|---|---|
| 3,877,226 | A * | 4/1975 | Blum | ........................ H01F 7/13 60/545 |
| 4,576,417 | A * | 3/1986 | Dobner | ..................... B60T 8/38 303/114.2 |
| 6,340,075 | B1 * | 1/2002 | Bok | ........................ F16D 55/36 188/71.5 |
| 7,338,017 | B2 | 3/2008 | Pitt | |
| 7,464,903 | B2 | 12/2008 | Pitt | |
| 7,555,901 | B2 * | 7/2009 | Dantlgraber | ............. B26D 5/12 60/534 |
| 9,254,913 | B2 * | 2/2016 | Drennen | ................. F16D 65/18 |
| 2010/0089053 | A1 | 4/2010 | Hanlon et al. | |
| 2012/0073285 | A1 | 3/2012 | Sakuma | |
| 2012/0089311 | A1 | 4/2012 | Burnett | |

(Continued)

FOREIGN PATENT DOCUMENTS

WO 2014048600 4/2014

OTHER PUBLICATIONS

Extended European Search Report dated Nov. 2, 2016 in European Application No. 16176944.3.

*Primary Examiner* — Xuan Lan Nguyen
(74) *Attorney, Agent, or Firm* — Snell & Wilmer, L.L.P.

(57) ABSTRACT

A braking system is provided. The braking system may comprise a brake stack and an electromechanical actuator mechanically coupled to the brake stack. A first hydraulic chamber may also be mechanically coupled to the brake stack and in fluid communication with a first piston of the electromechanical actuator. A second piston may be in fluid communication with the first hydraulic chamber. The second piston may also be configured to translate towards the brake stack in response to a translation of the first piston.

5 Claims, 3 Drawing Sheets

(56) References Cited

U.S. PATENT DOCUMENTS

| | | | |
|---|---|---|---|
| 2015/0114770 A1* | 4/2015 | Arrigoni | B60T 13/745 |
| | | | 188/106 F |
| 2015/0122593 A1* | 5/2015 | Drennen | F16D 65/18 |
| | | | 188/71.5 |
| 2015/0122594 A1* | 5/2015 | Lucienne | F16D 55/40 |
| | | | 188/71.8 |

* cited by examiner

HYBRID ELECTRIC AND HYDRAULIC BRAKE SYSTEM

FIELD OF INVENTION

The present disclosure relates to braking systems, and, more specifically, to a hybrid braking system using electromechanical actuators and hydraulic systems.

BACKGROUND

Aircraft braking systems typically operate by applying force to a brake stack to oppose rotation of the wheels. The braking systems may generate braking force using electromechanical actuators. A brake system on an individual wheel may comprise multiple electromechanical actuators applying pressure at various locations on the brake stack. As the brake stack wears, it may warp. A warped brake stack may provide an uneven surface for the electromechanical actuators to press against. Electromechanical actuators may respond to the uneven surfaces by adjusting in response to the rotational position of the warped brake stack, which may be rotating at frequencies incident to a wheel rotating at over 100 miles per hour. However, the adjustments occurring at high frequencies may cause excessive wear on the braking system.

Aircraft braking systems may also operate by applying force to a brake stack to oppose rotation of the wheels using a hydraulic system. Hydraulic brakes may have a mechanical pedal or lever that transmits hydraulic fluid in the system in response to depression of the pedal. Hydraulic systems may better address the issue of warped brake stacks than electromechanical actuators. However, hydraulic systems may also include long brake lines along a flexible landing gear that may result in leaks. Maintenance on hydraulic systems may further require bleeding the entire hydraulic system. Further, loss of a hydraulic piston may result in loss of braking force on an entire a wheel.

SUMMARY

According to various embodiments, a braking system may comprise a brake stack and an electromechanical actuator mechanically coupled to the brake stack. A first hydraulic chamber may also be mechanically coupled to the brake stack and in fluid communication with a first piston of the electromechanical actuator. A second piston may be in fluid communication with the first hydraulic chamber. The second piston may also be configured to translate towards the brake stack in response to a translation of the first piston.

In various embodiments, the first hydraulic chamber may be a hydraulic manifold. A third piston may be in fluid communication with the hydraulic manifold with the second piston and the third piston configured to apply an equalized force to the brake stack. A second hydraulic chamber may be in fluid communication with the first hydraulic chamber. A valve may be configured to disable fluid communication between the first hydraulic chamber and the second hydraulic chamber in response to the valve closing. The electromechanical actuator is configured to control a hydraulic pressure in the first hydraulic chamber and the second hydraulic chamber. A second electromechanical actuator is configured to control the hydraulic pressure in the first hydraulic chamber and the second hydraulic chamber in concert with the electromechanical actuator.

According to various embodiments, a hybrid actuation system may comprise a first electromechanical actuator having a first piston. A first hydraulic chamber may be mechanically coupled to the first electromechanical actuator with the first piston in fluid communication with the first hydraulic chamber. A second piston may be in fluid communication with the first hydraulic chamber. The second piston may also be configured to translate in response to a translation of the first piston. A second hydraulic chamber may be in fluid communication with the first hydraulic chamber. A second electromechanical actuator may include a third piston and be mechanically coupled to the second hydraulic chamber. The third piston may be in fluid communication with the second hydraulic chamber.

In various embodiments, the first hydraulic chamber may be a hydraulic manifold. A fourth piston may be in fluid communication with the hydraulic manifold with the second piston and the fourth piston configured to apply an equalized force. A conduit may be coupled between the first hydraulic chamber and the second hydraulic chamber. A valve may be configured to disable fluid communication between the first hydraulic chamber and the second hydraulic chamber in response to the valve closing. The first electromechanical actuator may be configured to control a hydraulic pressure in the first hydraulic chamber. The second electromechanical actuator may be configured to control the hydraulic pressure in the first hydraulic chamber and the second hydraulic chamber in concert with the first electromechanical actuator.

According to various embodiments, a wheel and brake assembly may comprise a wheel and a brake stack mechanically coupled to the wheel. A first electromechanical actuator may be mechanically coupled to the brake stack. A first hydraulic chamber may further be coupled to the first electromechanical actuator. The first hydraulic chamber may be in fluid communication with a piston of the first electromechanical actuator. A second piston may be in fluid communication with the first hydraulic chamber and configured to translate towards the brake stack in response to a translation of the piston of the first electromechanical actuator.

In various embodiments, the first hydraulic chamber may comprise a hydraulic manifold. A third piston may be in fluid communication with the hydraulic manifold. The second piston and the third piston may be configured to apply an equalized force to the brake stack. A second hydraulic chamber may be in fluid communication with the first hydraulic chamber. A valve may be configured to disable fluid communication between the first hydraulic chamber and the second hydraulic chamber in response to the valve closing. The first electromechanical actuator may be configured to control a hydraulic pressure in the first hydraulic chamber and the second hydraulic chamber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Cross hatching may be used throughout the figures to denote different parts but not necessarily to denote the same or different materials.

The hybrid brake actuation systems of the present disclosure may utilize an electromechanical actuator (EMA) to translate one or more hydraulic pistons. The hydraulic pistons may balance force across one another in response to rotation of a brake stack having an uneven surface. The electromechanical actuator may provide an increased response rate without extending hydraulic lines throughout the aircraft. In that regard, the hybrid system may tend to reduce the weight of an aircraft brake system.

Figure 1:
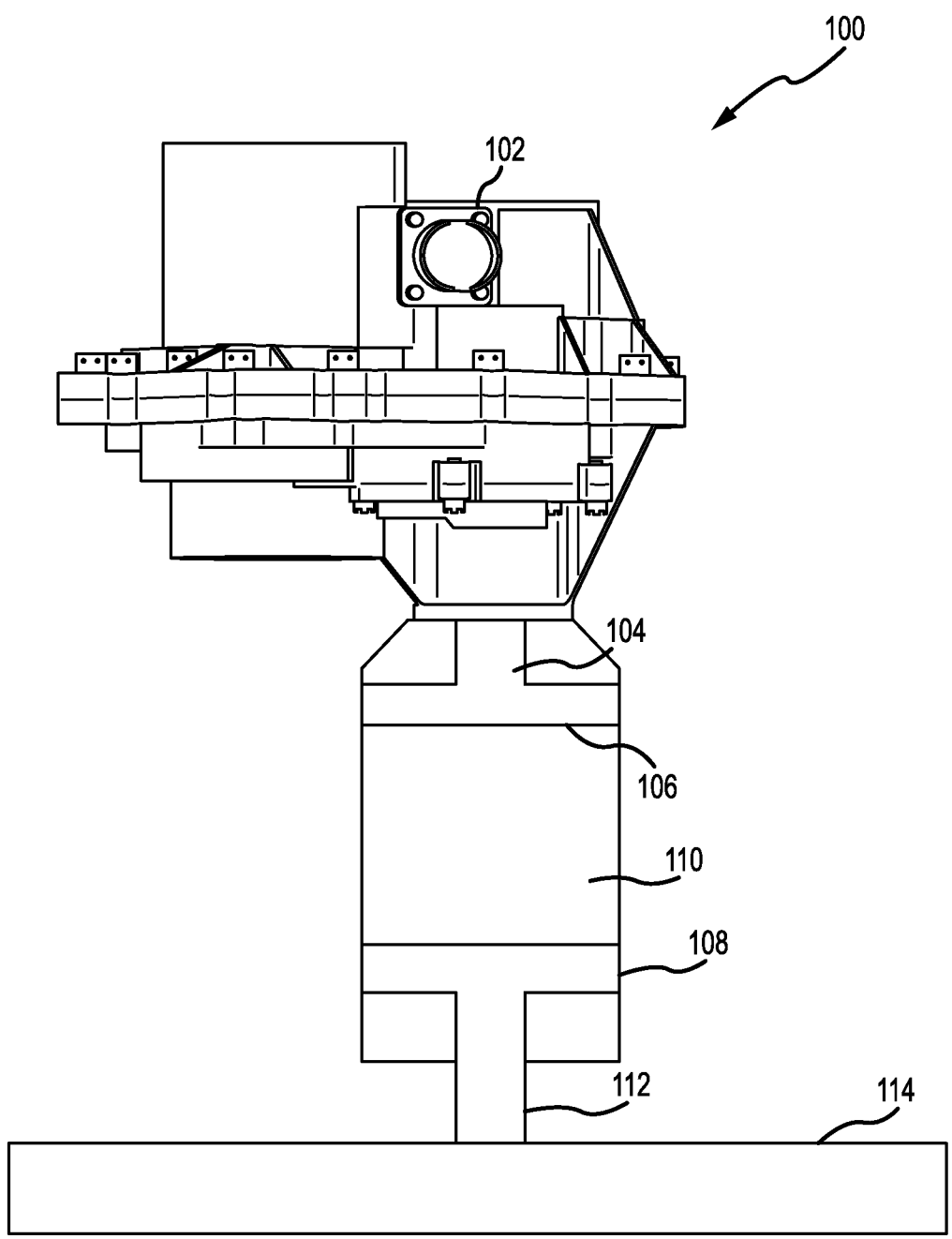
FIG. 1 illustrates a hybrid actuator having an electromechanical actuator coupled to a hydraulic brake system, in accordance with various embodiments.

With reference to FIG. 1, a hybrid brake actuation system 100 is shown, in accordance with various embodiments. Hybrid brake actuation system 100 may comprise one or more actuators 102. In various embodiments, actuators 102 comprise an electromechanical actuator driving a hydraulic system. For example, actuator 102 may be a ball screw-type actuator comprising a rotating element coupled to and configured to linearly translate a piston within actuator 102. As described in further detail below, the piston may translate into and out a hydraulic chamber to control hydraulic pressure. Brake stack 114 may be mechanically coupled to and rotate with a wheel. Actuator 102 may apply pressure to brake stack 114 to slow the rotation of a wheel.

Hybrid brake actuation system 100 may comprise EMA 102. EMA 102 may be electrically coupled to an electronic brake control unit to provide control for the braking system. EMA 102 may actuate piston 104 and thereby translate plunger 106. Plunger 106 may sealably slide against the walls of hydraulic chamber 110. In that regard, the position of plunger 106 may control the pressure in hydraulic chamber 110. As plunger 106 moves closer to brake stack 114, the pressure in hydraulic chamber 110 may tend to increase. Hydraulic chamber 110 may contain a hydraulic fluid or other liquid.

The hydraulic pressure in hydraulic chamber 110, and thus the movement of plunger 106, may result in translation of plunger 108 and piston 112 towards brake stack 114. Piston 112 may translate towards brake stack 114 and apply pressure to brake stack 114 proportional to the hydraulic pressure in hydraulic chamber 110. The hydraulic chamber 110 may be coupled to other components as discussed in greater detail below. The relative size of plunger 106 and plunger 108 may be selected to apply a desired force at brake stack 114 as a result of translation of piston 104.

Figure 2:
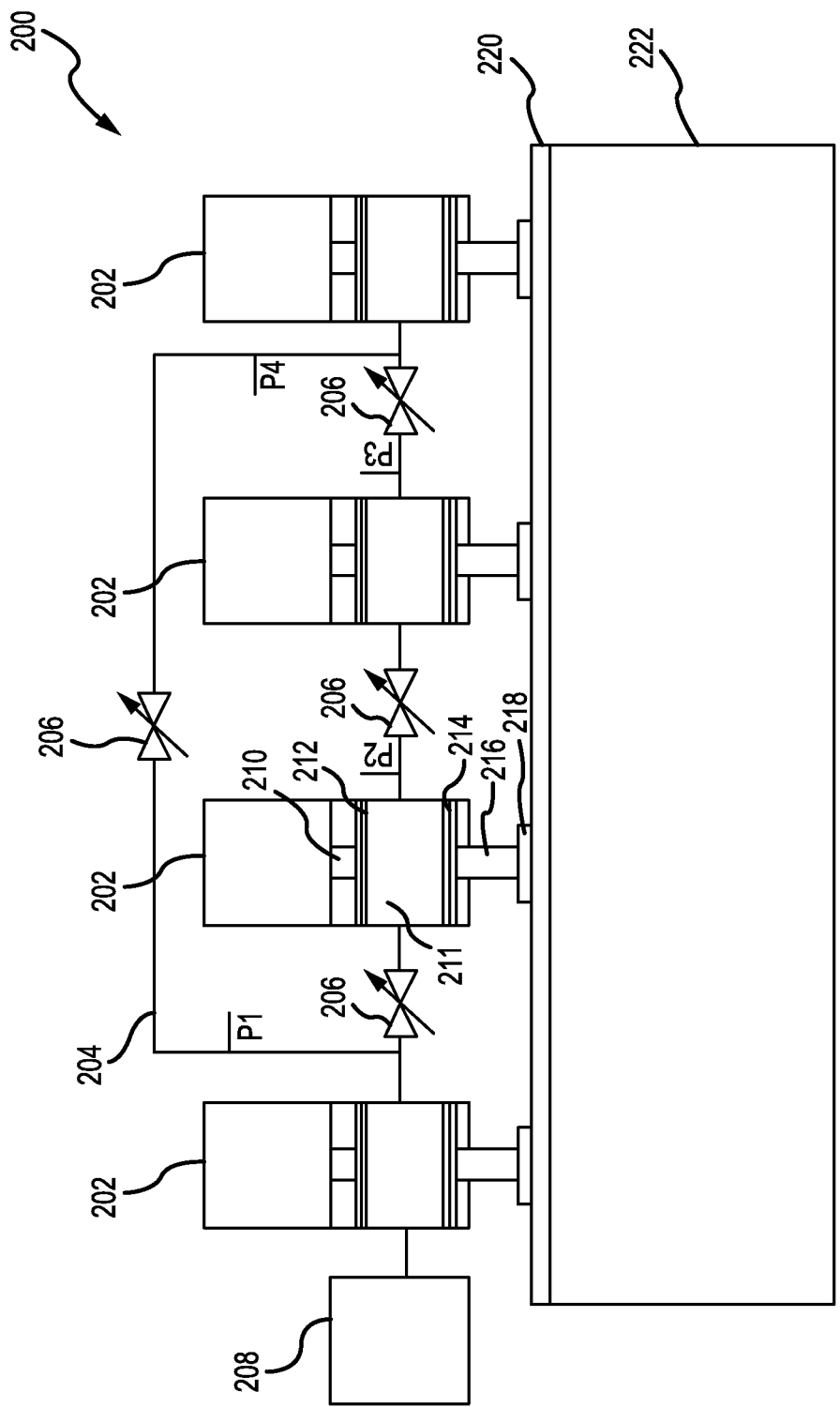
FIG. 2 illustrates a hybrid electric and hydraulic brake system with an electromechanical actuator for each puck, in accordance with various embodiments.

With reference to FIG. 2, a hybrid brake system 200 is shown with multiple EMAs 202, in accordance with various embodiments. Each EMA 202 may comprise a piston 210 and plunger 212 to fluidly communicate with hydraulic chamber 211. Hydraulic chambers 211 may be in fluidly communication via conduit 204. Valves 206 may be disposed between segments of conduit 204 to open and close fluid connections between each hydraulic chamber 211. In that regard, an individual hydraulic chamber 211 may be fluidly isolated from other hydraulic chambers 211 by closing the appropriate valves 206. A hydraulic accumulator may by fluidly coupled to hydraulic chambers 211 of EMA 202 to serve as a pressure reservoir.

In various embodiments, the system may include pressure measurement locations at points P1, P2, P3, and P4. Each fluid measurement point may be located between adjacent hydraulic chambers 211 to provide redundancy. The pressure in the hydraulic chambers 211 may be equalized in response to transfer valves 206 being open. The pressure in hydraulic chambers 211 may urge plunger 214 and piston 216 towards force plate 220 and heatsink 222 of the brake stack. As a result, puck 218 may contact force plate 220 and cause friction between force plate 220 and puck 218.

In various embodiments, an EMA 202 may fail such that the piston 210 mechanically coupled to the failed EMA no longer translates. The EMAs 202 still working may provide hydraulic pressure into the hydraulic chamber 211 corresponding to the failed EMA 202 so that the puck 218 corresponding to the failed EMA 202 may still contact and press into force plate 220. The hydraulic pressure in hydraulic chambers 211 being equalized across valves 206 may equalize the force exerted by pucks 218 on a varied, rotating surface of force plate 220. EMAs 202 may control braking with a warped brake stack without the need to adjust for the position of the rotating brake stack due to the balancing of hydraulic pressure across hydraulic chambers 211.

Figure 3:
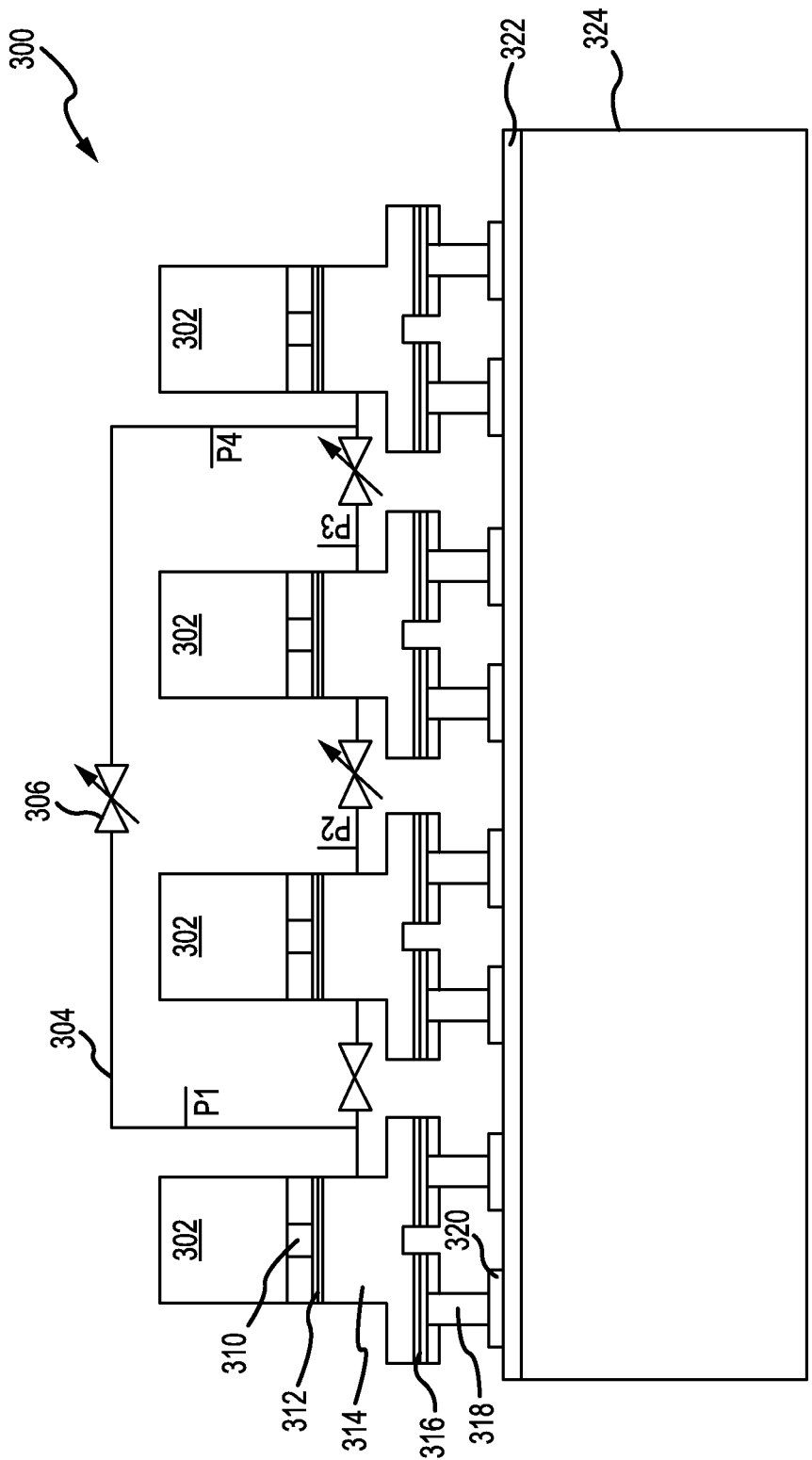
FIG. 3 illustrates a hybrid electric and hydraulic brake system with multiple pucks for each electromechanical actuator, in accordance with various embodiments.

With reference to FIG. 3, in accordance with various embodiments, a hybrid actuation system 300 is shown with multiple EMAs 302 and hydraulic manifolds 314. Each EMA 302 may comprise a piston 310 and plunger 312 to fluidly communicate with hydraulic manifold 314. Hydraulic manifolds 314 may be in fluidly communication via conduit 304. Valves 306 may be disposed between segments of conduit 304 to open and close fluid connections between each hydraulic manifold 314. In that regard, an individual hydraulic manifold 314 may be fluidly isolated from other hydraulic manifolds 314 by closing the appropriate valves 306.

In various embodiments, the system may include pressure measurement locations at points P1, P2, P3, and P4. Each fluid measurement point may be located between adjacent hydraulic manifold 314 to provide redundancy. The pressure in the hydraulic manifold 314 may be equalized in response to transfer valves 306 being open. The pressure in hydraulic manifold 314 may urge plunger 316 and piston 318 towards force plate 322 and heatsink 324 of the brake stack. As a result, puck 320 may contact force plate 322 and cause friction between force plate 322 and puck 320.

In various embodiments, an EMA 302 may fail such that the piston 310 mechanically coupled to the failed EMA no longer translates. The EMAs 302 still operating normally may provide hydraulic pressure in hydraulic manifold 314 corresponding to the failed EMA 302 so that the puck 320 corresponding to the failed EMA 302 may still contact and press into force plate 322. The hydraulic pressure in hydraulic manifolds 314 being equalized across valves 306 may equalize the force exerted by pucks 320 on a varied, rotating surface of force plate 322. EMAs 302 may control braking with a warped brake stack without adjusting for the position of the rotating brake stack due to the balancing of hydraulic pressure across hydraulic manifold 314.

In various embodiments, each EMA 302 may drive two or more pucks 320 in a manifold configuration as shown in FIG. 3. Each EMA 302 may operate independently with valves 306 closed or in concert with valves 306 open.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A braking system, comprising:
a brake stack having a force plate coupled to a heatsink;
a first electromechanical actuator having a first hydraulic chamber in fluid communication with a first piston configured for contact with the force plate;
a second electromechanical actuator having a second hydraulic chamber in fluid communication with a second piston configured for contact with the force plate;
a third electromechanical actuator having a third hydraulic chamber in fluid communication with a third piston configured for contact with the force plate;
a first conduit extending between, and in fluid communication with, the first hydraulic chamber and the second hydraulic chamber, wherein the first hydraulic chamber is in fluid communication with the second hydraulic chamber through the first conduit;
a first valve disposed within the first conduit and configured to equalize hydraulic pressure between the first hydraulic chamber and the second hydraulic chamber when the first valve is in a first open position;
a second conduit extending between, and in fluid communication with, the second hydraulic chamber and the third hydraulic chamber, wherein the second hydraulic chamber is in fluid communication with the third hydraulic chamber through the second conduit;
a second valve disposed within the second conduit and configured to equalize hydraulic pressure between the second hydraulic chamber and the third hydraulic chamber when the second valve is in a second open position,
wherein the first electromechanical actuator and the second electromechanical actuator actuate independently in response to the first valve being in a first valve closed position and the second valve being in a second valve closed position.

2. The braking system of claim 1, wherein the first piston, the second piston, and the third piston are configured to apply an equalized force to the brake stack in response to the equalized hydraulic pressure between the first hydraulic chamber, the second hydraulic chamber, and the third hydraulic chamber when the first valve and the second valve are each in the open position.

3. A wheel and brake assembly, comprising:
a wheel;
a brake stack mechanically coupled to the wheel, the brake stack having a force plate coupled to a heatsink;
a first electromechanical actuator having a first hydraulic chamber in fluid communication with a first piston configured for contact with the force plate;
a second electromechanical actuator having a second hydraulic chamber in fluid communication with a second piston configured for contact with the force plate;
a third electromechanical actuator having a third hydraulic chamber in fluid communication with a third piston configured for contact with the force plate;
a first conduit extending between, and in fluid communication with, the first hydraulic chamber and the second hydraulic chamber, wherein the first hydraulic chamber is in fluid communication with the second hydraulic chamber through the first conduit;
a first valve disposed within the first conduit and configured to equalize hydraulic pressure between the first hydraulic chamber and the second hydraulic chamber when the first valve is in a first open position;
a second conduit extending between, and in fluid communication with, the second hydraulic chamber and the third hydraulic chamber, wherein the second hydraulic chamber is in fluid communication with the third hydraulic chamber through the second conduit;
a second valve disposed within the second conduit and configured to equalize hydraulic pressure between the second hydraulic chamber and the third hydraulic chamber when the second valve is in a second open position,
wherein the first electromechanical actuator and the second electromechanical actuator actuate independently in response to the first valve being in a first closed position and the second valve being in a second valve closed position.

4. The wheel and brake assembly of claim 3, wherein the first piston, the second piston, and the third piston are configured to apply an equalized force to the brake stack in response to the equalized hydraulic pressure between the first hydraulic chamber, the second hydraulic chamber, and the third hydraulic chamber when the first valve and the second valve are each in the open position.

5. A braking system, comprising:
a brake stack having a force plate coupled to a heatsink;
a first electromechanical actuator having a first hydraulic chamber;
a second electromechanical actuator having a second hydraulic chamber;
a third electromechanical actuator having a third hydraulic chamber;
a fourth electromechanical actuator having a fourth hydraulic chamber;
a first conduit having a first valve, the first conduit fluidly coupling the first hydraulic chamber and the second hydraulic chamber, the first valve being configured to open and close;
a second conduit having a second valve, the second conduit fluidly coupling the second hydraulic chamber and the third hydraulic chamber, the second valve being configured to open and close;
a third conduit having a third valve, the third conduit fluidly coupling the third hydraulic chamber and the fourth hydraulic chamber, the third valve being configured to open and close;
a fourth conduit having a fourth valve, the fourth conduit fluidly coupling the first hydraulic chamber and the fourth hydraulic chamber, the fourth valve being configured to open and close,
wherein the first electromechanical actuator and the second electromechanical actuator actuate independently in response to the first valve being in a first closed position and the second valve being in a second valve closed position, and
wherein each hydraulic chamber is in fluid communication with a piston configured for contact with the force plate.

* * * * *